Figure 1:
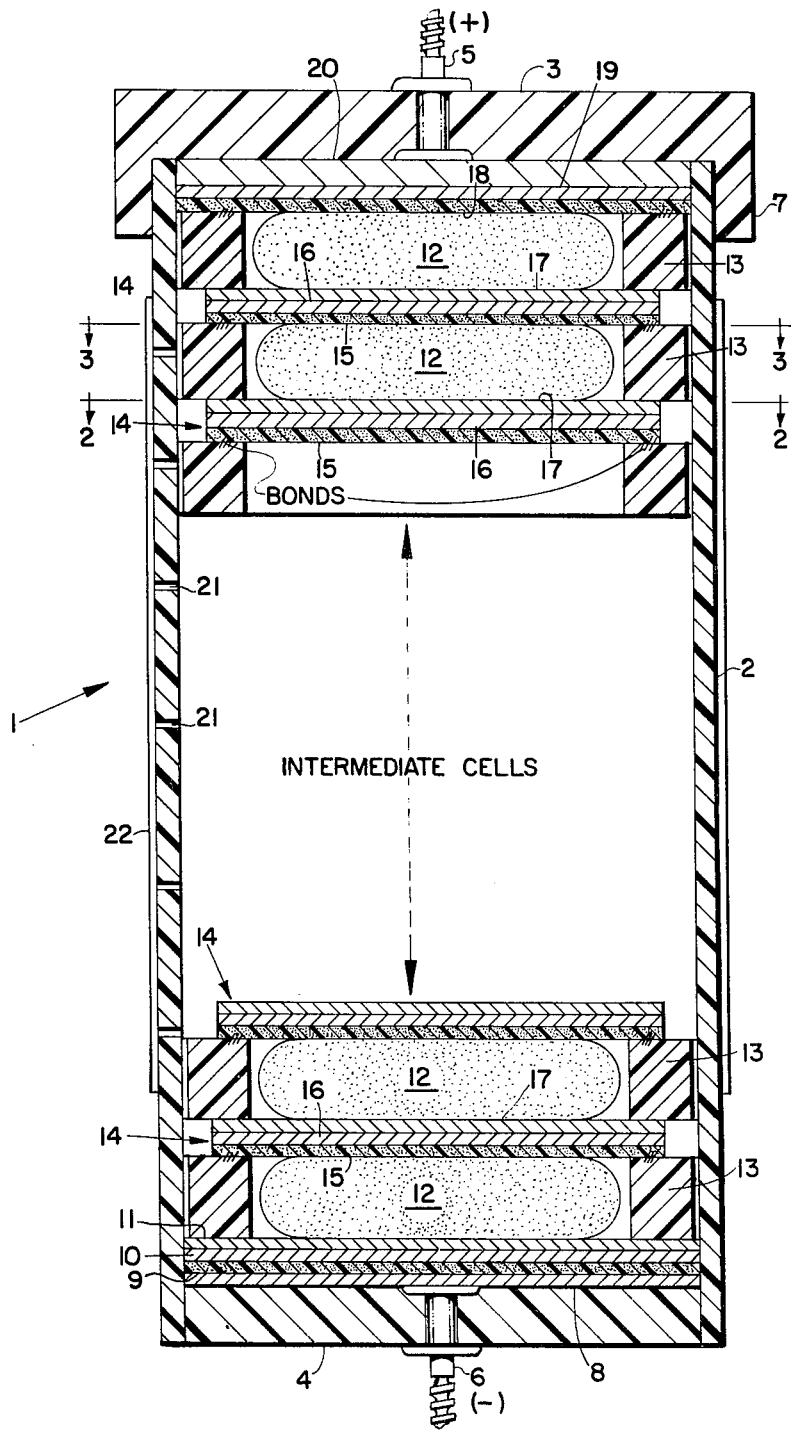

United States Patent [19]

Land et al.

[11] 4,194,061
[45] Mar. 18, 1980

[54] COMPACT HIGH VOLTAGE BATTERY

[75] Inventors: Edwin H. Land, Cambridge; Gordon F. Kinsman, Billerica, both of Mass.

[73] Assignee: Polaroid Corporation, Cambridge, Mass.

[21] Appl. No.: 23,309

[22] Filed: Mar. 23, 1979

[51] Int. Cl.² .................................... H01M 2/12
[52] U.S. Cl. .................... 429/82; 429/153; 429/162
[58] Field of Search ............... 429/152–155, 429/72, 82, 162

[56] References Cited

U.S. PATENT DOCUMENTS

| Re. 24,408 | 12/1957 | Hack et al. | 429/153 |
|---|---|---|---|
| 2,928,890 | 3/1960 | Van Der Günten et al. | 429/152 |
| 4,047,289 | 9/1977 | Wolff | 429/153 X |
| 4,098,965 | 7/1978 | Kinsman | 429/153 |
| 4,105,831 | 8/1978 | Plasse | 429/162 X |
| 4,119,770 | 10/1978 | Land | 429/152 |
| 4,124,742 | 11/1978 | Land et al. | 429/162 X |
| 4,125,685 | 11/1978 | Bloom et al. | 429/152 X |
| 4,125,686 | 11/1978 | Kinsman | 429/162 X |

OTHER PUBLICATIONS

Primary Batteries, G. Vinal, 1950, J. Wiley & Sons, Inc., pp. 53–57.

*Primary Examiner*—Charles F. LeFevour
*Attorney, Agent, or Firm*—John W. Ericson

[57] ABSTRACT

A high voltage, low impedance laminar battery comprising a stack of series connected cells confined under pressure in a housing. The cells comprise laminar anodes, cathodes and separators. The cells are connected in series by laminar conductive intercell connectors. An annular spacer is associated with each cell. The spacers are separated by interdigitated ones of the separators and intercell connectors.

6 Claims, 3 Drawing Figures

FIG. I

COMPACT HIGH VOLTAGE BATTERY

This application relates to electrical batteries, and particularly to a novel laminar battery particularly suited for high voltage, high current drain applications.

Laminar batteries, comprising a series connected stack of thin flat cells, were originally developed for high voltage, low current drain applications, as for use as B batteries in battery operated radios. Early radios of this kind used vacuum tubes requiring plate voltages up to several hundred volts, but requiring currents measured in milliamperes. For such service, the internal impedance of the battery was not a major concern. As pointed out by George Vinal in an article on such batteries appearing on pages 53–57 of his book entitled *Primary Batteries,* published in 1950 by John Wiley & Sons, Inc., in New York, N.Y., the impedance of flat cells was likely to be higher than that of the corresponding round cells.

Batteries of flat cells, and particularly high voltage batteries of many cells, present several requirements to the artisan that are somewhat conflicting. One is the need to confine the electrolyte in the individual cells, to prevent intercell leakage of electrolyte that would cause intercell short circuits. Excessive loss of water from the electrolyte must also be prevented, but provision for venting gases, particularly hydrogen, that may be evolved in the cells must also be made.

Very low impedance batteries for relatively low voltage service at high current drains have been developed. Such batteries are described in U.S. Pat. No. 4,119,770, issued on Oct. 10, 1978 to Edwin H. Land for Electrical Cells and Batteries and assigned to the assignee of this invention. Four cell batteries of this kind may be less than 0.15 inches in thickness.

The usual procedure for preventing electrolyte loss in laminar batteries such as those described in U.S. Pat. No. 4,119,770 to provide peripheral seals formed by frames of thermoplastic material that individually confine the electrolyte in each cell, preventing intercell leakage and inhibiting moisture loss. If the frames are of sufficient thickness and appropriate permeability to gases, adequate venting may take place through the frames. Frequently, a special venting mechanism is desirable, and may be provided in the manner described in U.S. Pat. No. 4,105,831, issued on Aug. 8, 1978 to Paul A. Plasse for Vented Flat Battery and assigned to the assignee of this invention.

Among the objects of this invention are to reduce the internal impedance of high voltage batteries of flat cells, while simplifying the construction of such batteries.

Briefly, the above and other objects and advantages of the invention are attained by the construction of a housing containing a stack of laminar cell elements held under pressure between end caps secured to the housing. The cell components comprise anodes, cathodes and separators permeated by aqueous electrolyte. The cathodes are preferably in the form of stable slurries of cathode active particles in aqueous electrolyte that will not exude electrolyte under pressure. The cathodes are preferably thicker than the anodes, but smaller in lateral area, and each cathode is surrounded by an annular spacer. The spacers preferably have thicknesses selected to make the components in the housing of nearly the same thickness in the edges as at the center, while allowing some additional central thickness to assure that the active cell elements are held under pressure.

The spacers also serve to define gas passsages that allow relatively free communication between gases in the various cells, to provide an expansion chamber that will serve as an accumulator for gases that may be generated under heavy discharge conditions. A selective venting mechanism is preferably provided that will allow the venting of gases formed in the battery while minimizing the loss of water from the electrolyte in the cells.

The construction of batteries in accordance with the invention will best be understood in the light of the following detailed description, together with the accompanying drawings.

Figure 2:
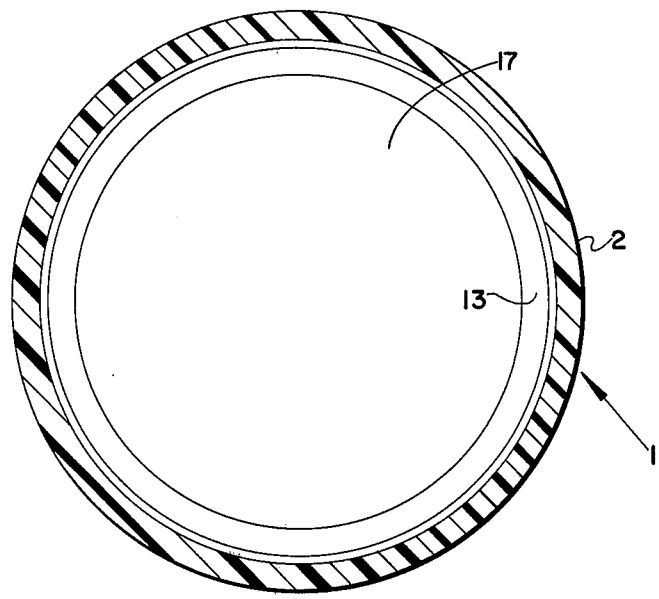
Figure 3:
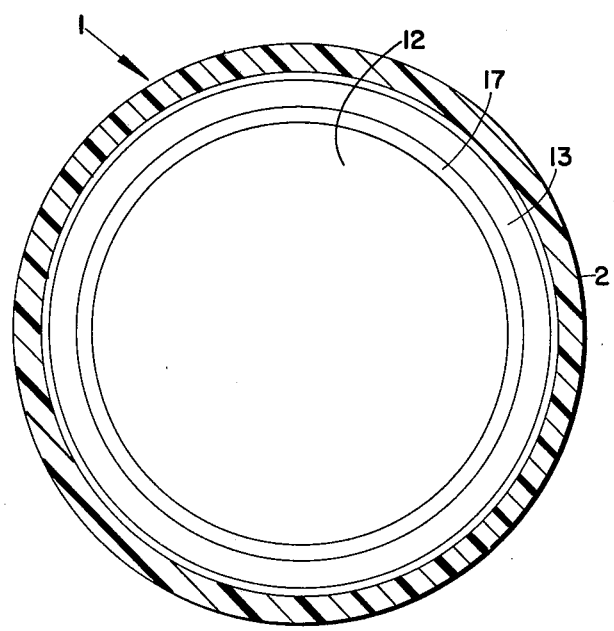

In the drawings, FIG. 1 is a schematic elevational sketch, with parts shown in cross section and parts omitted, of a battery in accordance with the invention;

FIG. 2 is a cross-sectional view of the battery of FIG. 1, taken essentially along the lines 2—2 in FIG. 1; and FIG. 3 is a view similar to that of FIG. 2, taken essentially along the lines 3—3 in FIG. 1.

Referring to the drawings, a battery 1 is shown comprising a cylindrical housing 2 closed at the ends by end caps 3 and 4. The housing 2 and end caps 3 and 4 may be of any suitable liquid impervious material, such as thermoplastic or thermosetting resin or the like.

The housing 2 may be of any desired cylindrical shape in cross-section. A preferred cross section from the standpoint of ease of assembly is circular, as shown in FIGS. 2 and 3. A circular cross section is also more efficient in that the ratio of area to perimeter is larger for a circle than for a rectangle or other shape. Thus, edge effects are minimized. However, a rectangular cylindrical cross section is quite feasible, and may be preferred from the point of view of economy of materials where certain of the components to be described are made from sheet material.

The end caps 3 and 4 are preferably provided with conventional terminal posts 5 and 6, respectively, as by making the end caps of a suitable molding resin and molding the terminal posts in place. As shown, the end cap 3 is provided with an annular flange 7 to receive one end of the housing 2, and the end cap 4 is fitted into the other end of the housing. The end caps may be threaded to engage mating threads on the housing, not shown, or they may be cemented, heat sealed or otherwise secured to the housing. One of the end caps, and preferably the end cap 4, is secured to the housing before the other components to be described are installed in the housing, and the other end cap is added as the last step in the assembly.

Within the housing are a plurality of cells constructed in a manner next to be described. In general, with specific exceptions to be noted below, the cells may be of the kind described in detail in U.S. Pat. No. 4,124,742, issued on Nov. 7, 1978 to Edwin H. Land and Gordon F. Kinsman for Electrical Cells And Batteries And Methods And Apparatus For Making The Same, and assigned to the assignee of this application.

The lowermost cell in FIG. 1 is terminated in a four part laminate comprising a conductive metal terminal sheet 8, a layer of conductive plastic 9, a coating 10 of electrode particles on the conductive plastic, and a separator 11 over the electrode particle layer 10. This laminate may be made by laminating a conductive plastic sheet to the metal terminal sheet in any conventional manner, coating the conductive plastic with a dispersion of electrode particles and a binder in water or other desired solvent, drying, and then laminating the separator to the dried electrode particle layer 10 in the manner described in detail in the above cited U.S. Pat. No. 4,124,742.

Various electrochemical systems may be employed in the manufacture of batteries in accordance with the invention. In a presently preferred embodiment of the invention, the electrode particle layer 10 comprises an anode layer of zinc particles and a binder laid down in an aqueous dispersion and dried.

The separator 11 may be of any conventional material such as paper, woven or non-woven fibrous sheet materials, or the like, but is preferably of cellophane. As disclosed in the above cited U.S. Pat. No. 4,119,770, regenerated cellulose free of humectants and plasticizers is an especially effective separator in a Leclanche cell environment.

On the separator 11 is an electrode 12 comprising electrode particles of an electrochemically active material different from the particles in the electrode layer 10. The electrode 12 is preferably a cathode slurry of manganese dioxide and carbon black in an aqueous electrolyte solution. Conventional electrolytes such as zinc chloride, ammonium chloride, mixtures of zinc chloride and ammonium chloride, potassium hydroxide, and the like, may be employed. When the slurry electrode 12 is placed on the separator 11, electrolyte from the slurry permeates the separator 11 and wets the electrode layer 10 and electrically completes the first cell.

A first annular insulating spacer 13 preferably surrounds the first electrode 12. The spacer 13, if present, is supported on, but not adhered to, the separator 11. The spacer 13 may be of any suitable insulating material, such as a thermoplastic or thermosetting resin or the like. Vinyl resins, such as copolymers of vinyl chloride and vinyl acetate or polyvinyl chloride, are examples of suitable materials. The spacer 13 is preferably selected in thickness such that as the cells are built up in the housing 2, the components are of approximately the same thickness at the edge as in the center, to aid in placing the cell components in the housing essentially parallel to the end caps.

The first spacer 13 is preferably adhered to a first triplex laminate 14. The laminate 14 comprises a sheet of conductive plastic 15 on which there is adhered an electrode layer 16 of the same material as the electrode layer 10. A separator 17 is at least initially adhered to the electrode layer 16.

The triplex laminate 14 may be made in the manner described in detail in U.S. Pat. No. 4,125,685, issued on Nov. 14, 1978 to Stanley M. Bloom, Charles K. Chiklis and Gordon F. Kinsman for Electrical Cells And Batteries And Methods Of Making The Same, and assigned to the assignee of this application. The laminates 14 may be made in the manner described in the above cited U.S. Pat. No. 4,124,742, by coating a sheet of conductive plastic with an aqueous dispersion of zinc powder and a binder, drying, and laminating the separator to the dried zinc coating under pressure with a small amount of an aqueous solution containing a binder. However, a preferred method is described in U.S. Application for Letters Patent Ser. No. 23,310, filed concurrently with this application by Paul Panchu for Methods For Making Laminates and assigned to the assignee of this application. Basically, in this method the steps of drying the coated zinc dispersion and adding the aqueous bonding agent are omitted, and the wet zinc dispersion on the conductive plastic is laminated directly to the cellophane. The wet laminate is then dried.

In a preferred embodiment of the invention, the conductive plastic sheets 15 were made of 2-mil Condulon, the electrode layers 16 comprised zinc powder and were made from the composition described in the above cited U.S. Pat. No. 4,124,742, and the separators 17 were made from PUD-0 cellophane 1.4 mils in thickness as made and sold by E. I. DuPont de Nemours & Company of Wilmington, Delaware.

In assembling a battery in accordance with the invention, subassemblies may first be made by adhering the borders of the conductive plastic sheets 15 in the laminate 14 to the spacers 13, as by heat and pressure, or a suitable adhesive or the like, as described in the above cited U.S. Pat. No. 4,125,685. The first cathode slurry 12 may then be extended or otherwise deposited on the conductive plastic surface 15 of the laminate 14 within the confines of the spacer 13.

The unit comprising the first spacer 13, laminate 14 and cathode slurry 12 may then be placed on the separator 11 of the terminal laminate also comprising the electrode layer 10, conductive plastic layer 9 and metal terminal 8, with the slurry 12 contacting the separator 11. Next, with the end cap 4 in place and the end cap 3 removed, the subassembly formed as just described is placed in the housing 2, in the position shown in FIG. 1, as with the aid of a suitable mandrel, or of a vacuum assisted pick and place device or the like.

A second unit is then made by depositing a cathode slurry 12 onto the conductive plastic surface 15 of another spacer 13 and laminate 14 subassembly. This second unit is then bonded into the housing 2 on top of the first. Assembly is then continued until the uppermost unit in FIG. 1, comprising a laminate 14, spacer 13, and cathode slurry 12 has been put in place.

A final cell unit is then prepared from a subassembly comprising a two part laminate of conductive plastic 18 and metal 19 adhered to the uppermost spacer 13 in FIG. 1, with the uppermost cathode slurry 12 in FIG. 1. The conductive plastic sheet 18 may be of the same material and thickness as the conductive plastic layers 9 and 15, and the metal terminal 19 may be of 2-mil aluminum foil or other suitably conductive metal.

A pressure plate 20, of any suitable conductive metal, for example, a phosphor bronze plate about one eighth of an inch in thickness, is preferably placed over the terminal sheet 20. The end cap 3 is the put in place under pressure, and secured in place as described above.

As shown in FIG. 1, the housing 2 is preferably provided with one or more vent ports 21, to allow the venting of gases such as hydrogen that may be formed within the battery. A liquid impermeable, gas permeable membrane 22, of polyvinyl chloride, polyethylene, or the like, preferably covers the vent ports 21 to limit the loss of water from the battery.

It will be noted that the spacers 13 in FIG. 1 are shown slightly smaller in outer dimensions than the internal dimension of the housing 2. In practice, the outer dimensions of the spacers may be essentially the same as the inner dimension of the housing, so long as the spacers are not sealed to the housing so as to prevent the relatively free movement of gases. Gas movement is also facilitated by the fact that the spacers are not sealed to the separators 15 and 17, but merely supported on them. Thus, gas that may evolve in a cell is not confined to that cell, but is relatively free to move into other regions of the battery.

Space for the accumulation of gases in the battery is provided between the cathode slurry deposits 12 and the spacer 13, and between the outer peripheries of the laminate 14 and the wall of the housing 2. The laminates 14 are preferably made somewhat smaller in lateral dimensions than the spacers 13, both to facilitate assembly of the components and to assist in providing a reservoir to allow the temporary accumulation of gases without an undue rise in pressure, as during high current discharge of the battery, until the gases can diffuse through the vent ports 21 and the membrane 22.

An eighty cell battery in accordance with the embodiment of the invention shown in FIG. 1 was made with 1.2 to 1.3 grams of cathode slurry per cell, the cathode slurry deposits being spread over an active area of 1.247 square inches. Zinc layers such as 10 and 16 in FIG. 1 were made about 1½ to 2 mils in thickness. Condulon conductive plastic 2 mils in thickness was employed. The metal terminals 8 and 19 were of 2 mil aluminum foil. Cellophane separators of 1.34 mil PUD-0 cellophane were employed. The cathode and anode compositions were those described in Example I of U.S. Pat. No. 4,124,742. This battery had a nominal voltage of 120 volts, and an internal impedance of 8 ohms when measured at 10 amperes for 1 microsecond. A housing 2 of poly(methyl methacrylate) was employed, with end caps of the same material. Vent ports 21 were provided, but the sleeve 22 was omitted.

The battery made as just described was used as the power source for a 1000 BCPS electronic flash unit, and operated the flash unit through 450 charge cycles, each followed by the discharge of the flash unit.

While the invention has been described with reference to the details of specific illustrative embodiments, many changes and variations will occur to those skilled in the art upon reading this description, and such can obviously be made without departing from the scope of the invention.

Having thus described the invention, what is claimed is:

1. A battery, comprising a housing, said housing comprising a cylindrical wall and end caps secured to opposed ends of said wall to form a chamber between said wall and said end caps; a plurality of laminar electrical cells stacked in contiguous series relationship in said chamber, said cells each comprising an electrically conductive layer, an anode layer on said electrically conductive layer, a separator permeated by liquid electrolyte on said anode layer, and a slurry cathode layer comprising a dispersion of cathode particles in liquid electrolyte on a central region of said separator; and an insulating spacer on each separator and formed with a central opening within which the cathode layer on said separator is received; the spacer on each separator, except the spacer on the separator in an end one of said cells, being separated from the spacer on the separator in the next contiguous cell by the electrically conductive layer, the anode layer, and the separator of said next contiguous cell.

2. The battery of claim 1, in which said stacked cells are terminated by a first metal collector plate adhered to the electrically conductive layer of a cell at one end of said stacked cells, and by an electrically conductive layer in contact with the cathode of the cell at the other end of said stacked cells and adhered to a second metal collector plate, means located between at least one of said end caps and an adjacent one of said metal collector plates for exerting pressure on said end caps and said stacked cells, and means forming at least one gas venting passage between said closed chamber and the exterior of said housing.

3. The battery of claim 2, in which the borders of said spacers extend beyond the borders of said anode layers, said electrically conducting layers, and said separators, forming toroidal gas spaces in said chamber between said wall, adjacent spacers, and the peripheries of said separators and said layers.

4. A battery, comprising a housing, said housing comprising a cylindrical wall and end caps secured to opposed ends of said wall to form a chamber between said wall and said end caps; a plurality of laminar electrical cells stacked in contiguous series relationship in said chamber, said cells each comprising an electrically conductive layer, an anode layer on said electrically conductive layer, a separator permeated by liquid electrolyte on said anode layer, and a slurry cathode layer comprising a dispersion of cathode particles in liquid electrolyte on a central region of said separator; and an insulating spacer supported on but not adhered to each separator and formed with a central opening within which the cathode layer on said separator is received; the spacer on each separator, except the spacer on the separator in an end one of said cells, being separated from the spacer on the separator in the next contiguous cell by the electrically conductive layer, the anode layer, and the separator of said next contiguous cell; and the borders of said spacers being adjacent to but not adhered to said wall to admit the passage of gas between said spacers and said wall.

5. A battery, comprising a housing, said housing comprising a cylindrical wall and end caps secured to opposed ends of said wall to form a chamber between said wall and said end caps; a plurality of laminar electrical cells stacked in contiguous series relationship in said chamber, said cells each comprising a conductive plastic layer, an anode on said conductive plastic layer, a separator on said anode, a cathode on a central region of said separator and liquid electrolyte permeating said anode, said separator, and said cathode; and an insulating spacer adhered to the borders of said conductive plastic layer and supported on but not adhered to each separator and formed with a central opening within which the cathode layer on said separator is received; the spacer on each separator, except the spacer on the separator in an end one of said cells, being separated from the spacer on the separator in the next contiguous cell by the conductive plastic layer, the anode layer, and the separator of said next contiguous cell; and the borders of said spacers being adjacent to but not adhered to said wall to admit the passage of gas between said spacers and said wall.

6. A battery, comprising a housing, said housing comprising a cylindrical wall and end caps secured to opposed ends of said wall to form a chamber between said wall and said end caps; a plurality of laminar electrical cells stacked in contiguous series relationship in said chamber, said cells each comprising an electrically conductive layer, a zinc anode layer on said electrically conductive layer, a cellophane separator permeated by liquid electrolyte on said anode layer, and a slurry cathode layer comprising a dispersion of manganese dioxide and carbon particles in liquid electrolyte on a central region of said separator; and an insulating spacer supported on but not adhered to each separator and formed with a central opening within which the cathode layer on said separator is received; the spacer on each separator, except the spacer on the separator in an end one of said cells, being separated from the spacer on the separator in the next contiguous cell by the electrically conductive layer, the anode layer, and the separator of said next contiguous cell; and the borders of said spacers being adjacent to but not adhered to said wall to admit the passage of gas between said spacers and said wall.

* * * * *